United States Patent [19]

Peters

[11] Patent Number: 5,418,270

[45] Date of Patent: * May 23, 1995

[54] MODIFIED THERMOPLASTIC ELASTOMERIC COMPOSITIONS

[75] Inventor: William E. Peters, Danville, Ind.

[73] Assignee: Alphaflex Industries, Inc., Indianapolis, Ind.

[*] Notice: The portion of the term of this patent subsequent to Feb. 28, 2012 has been disclaimed.

[21] Appl. No.: 226,692

[22] Filed: Apr. 12, 1994

[51] Int. Cl.$^6$ .......................... C08K 3/30; C08K 3/10; C08L 53/02; C08L 27/12

[52] U.S. Cl. .................. 524/406; 524/420; 524/505; 524/520; 524/546

[58] Field of Search ............... 524/406, 420, 505, 520, 524/546

[56] References Cited

U.S. PATENT DOCUMENTS

| | | | |
|---|---|---|---|
| 2,710,290 | 6/1955 | Safford et al. | 260/41 |
| 2,719,833 | 10/1955 | Vincent et al. | 260/33.6 |
| 2,951,721 | 9/1960 | Asp | 288/16 |
| 3,019,206 | 1/1962 | Robb | 260/29.6 |
| 3,230,919 | 1/1966 | Crawford | 114/67 |
| 3,575,123 | 4/1971 | Shepherd et al. | 114/67 R |
| 3,878,031 | 4/1975 | Dormer | 428/365 |
| 3,940,455 | 2/1976 | Kaufman | 260/888 |
| 4,075,158 | 2/1978 | Coale | 260/42.17 |
| 4,096,207 | 6/1978 | Saxon et al. | 260/900 |
| 4,129,550 | 12/1978 | Nametkin et al. | 260/42.22 |
| 4,183,887 | 1/1980 | Karg | 264/130 |
| 4,215,178 | 7/1980 | Martin, Jr. | 428/421 |
| 4,326,046 | 4/1982 | Miyaka et al. | 525/276 |
| 4,385,019 | 5/1983 | Bernstein et al. | 264/49 |
| 4,387,168 | 6/1983 | Morita | 521/54 |
| 4,477,630 | 10/1984 | Saito et al. | 525/133 |
| 4,507,439 | 3/1985 | Stewart | 525/199 |
| 4,520,170 | 5/1985 | Kitto | 525/200 |
| 4,596,839 | 6/1986 | Peters | 523/175 |
| 4,962,136 | 10/1990 | Peters | 524/406 |

FOREIGN PATENT DOCUMENTS 60-199045  8/1985  Japan.
996764  6/1965  United Kingdom.

OTHER PUBLICATIONS

Shell Chemical Company publication SC:198-92, *Kraton Polymers for Adhesives and Sealants*.
Shell Chemical Company publication SC:68-92, *Kraton Thermoplastic Rubber*.
Amax, Inc. article, *How Does MoS$_2$ Differ From Other Solid Lubricants?*.
Imperial Chemical Industries, Ltd. publication, '*FLUON*': *Polytetrafluoroethylene*.
ICI Americas, Inc. product information brochure, *Fluon CD 1*.
ICI Americas, Inc. product information brochure, *Fluon CD 525*.
Dow Corning Corp. product description, *Information about MOLYKOTE Specialty Lubricants*, 1979.
Amax, Inc. product data sheet SC-9, *Molybdenum Products*, 1985.

Primary Examiner—Peter A. Szekely
Attorney, Agent, or Firm—Willian Brinks Hofer Gilson & Lione

[57] ABSTRACT

A composition comprises fibrillated polytetrafluoroethylene, molybdenum disulfide and a thermoplastic elastomeric material. In the composition, fibrillatable polytetrafluoroethylene is preassociated with molybdenum disulfide and combined with a thermoplastic elastomeric copolymer in relative amounts from as low as about 2 parts per hundred rubber to as high as about 12 parts per hundred rubber, with the balance thermoplastic elastomeric copolymer and filler. The composition can further include an unpolymerized polytetrafluoroethylene binder residue of the fibrillated polytetrafluoroethylene.

26 Claims, No Drawings

MODIFIED THERMOPLASTIC ELASTOMERIC COMPOSITIONS

FIELD OF THE INVENTION

This invention relates to thermoplastic elastomeric compositions and particularly to thermoplastic elastomeric compositions modified by polytetrafluoroethylene compositions.

BACKGROUND OF THE INVENTION

Thermoplastic elastomeric block copolymers differ in molecular structure from typical plastic and commercial rubbers, which are generally homopolymers or random copolymers. That is, thermoplastic elastomeric block copolymers generally comprise two incompatible polymers, a thermoplastic end block polymer, typically polystyrene, chemically joined with one of several elastomeric mid block polymers. In use, the block copolymers tend to provide an elastic lattice structure interconnected by domains formed by their thermoplastic end blocks. Since the lattice structure is the result of physical rather than chemical forces, it may be destroyed either by dissolving the copolymer in a solvent or by heating it beyond the glass transition temperature of its thermoplastic end blocks. Upon evaporation of the solvent or cooling below the glass transition temperature of its thermoplastic end blocks, a structure may be re-imparted to the block copolymer. Such block copolymers are thus recyclable.

Thermoplastic block copolymers can include styrene-butadiene-styrene copolymers (SBS), styrene-isoprene-styrene copolymers (SIS) and styrene-ethylene/butylene-styrene copolymers (SEBS). In addition to the traditional ABA-type tri-block polymers, such copolymers are available in the radial $(A-B)_n$ and a di-block (A-B) structures. Prior to processing, the polystyrene end blocks of such copolymers are associated in rigid domains through physical cross-linking to yield a continuous three dimensional network. During processing in the presence of heat and shear or solvent, the polystyrene domains soften and permit flow and after cooling, reform to lock the interconnecting elastomeric network in place. The styrene domains can impart high tensile strength to the resulting structure and the elastomeric mid block polymers can impart elasticity, cold flow flexibility and fatigue resistance.

Thermoplastic, non-vulcanite elastomeric copolymers have been developed for use in a wide variety of applications, such as gaskets, seals, blown films, elastic fibers, hot melt adhesives, sealants, caulking and tapes.

It is their distinctive molecular structure that is the key to the wide utility of thermoplastic elastomers. However, the structural makeup of thermoplastic elastomers that gives them such a wide range of capabilities also contains the seeds of weakness. Specifically, the elastomeric mid block that imparts flexibility to the structure also decreases the compound's abrasion resistance, life, strength, and chemical inertness. In addition, while the plastic end blocks add strength to the structure, they also limit the amount of elastic deformation that the structure can tolerate. For instance, when the thermoplastic end block is heated, it melts and flows. Since the thermoplastic end block has no "memory", it retains its new configuration when it cools. That is, the deformation caused by the flowing of the end block is irreversible. The structure of the thermoplastic elastomeric copolymer is also highly susceptible to degradation by hydrocarbons and solvents. While such degradation is useful in a recycling sense, it is unacceptable in other applications.

A composition that can be added to the thermoplastic elastomeric copolymers to increase the mechanical properties such as abrasion resistance, solvent resistance, useful life, strength, and the like would be welcome by users of thermoplastic elastomeric copolymers.

U.S. Pat. Nos. 4,596,839 and 4,962,136 disclose the improvement of the elastomer compositions by an additive including particulate polytetrafluoroethylene (PTFE) and an amount of particulate molybdenum disulfide ($MoS_2$) effective to provide uniform mixing of the polytetrafluoroethylene and the elastomer composition. These patents further disclose a new composition can comprise about 25 to about 80 percent PTFE and about 1 to about 30 percent $MoS_2$ by weight, with the balance of elastomer. The patents also disclose preferable compositions including about 2 to about 6 percent of PTFE that is fibrillatable and fibrillated in the composition when combined with an effective amount of $MoS_2$. The polytetrafluoroethylenemolybdenum disulfide additives are disclosed as being useful in polymers, generally known as rubbers, including natural rubber and synthetic rubber elastomers and other polymers capable of forming elastic solids with similar properties. More specifically, such elastomers include, in addition to natural rubber, styrene butadiene rubber, acrylonitrile butadiene rubber, butyl rubber, ethylene-propylene rubber, polyurethane elastomers, CIS-polybutadiene polychloriprene, poly(epichlorohydrin), polyacrylate, silicone rubbers, poly(fluorinated hydrocarbons), olefin polysulfide, polyisoprene and the like. It is also disclosed that such compositions can also include plasticizers and softeners, extenders, reclaimed rubber, fillers, reinforcing fillers, coloring agents, antioxidants, accelerators and vulcanizing actuators.

Whenever composition ingredients are expressed in percentages, it is to be understood that the expressed percentage is the percent by weight of the resulting composition, unless otherwise stated. Where compositions are expressed in parts, it is to be understood that they are expressed in parts per hundred rubber by weight.

BRIEF STATEMENT OF INVENTION

The present invention provides a composition comprising fibrillated polytetrafluoroethylene, molybdenum disulfide and a thermoplastic elastomeric material. In preferred embodiments of the invention, the thermoplastic elastomeric material comprises a two phase copolymer of two incompatible polymers comprising a thermoplastic end block polymer, typically a styrene polymer, and an elastomeric mid block polymer. Preferred mid block polymers can be selected from a group consisting of polybutadiene, polyisoprene and poly(ethylene-butylene) and can be saturated or unsaturated polymers, The PTFE is fibrillatable and mixed with the $MoS_2$ in the range of about 3 to 1 to about 6 to 1 by weight. In compositions of the invention, fibrillatable polytetrafluoroethylene which has been preassociated with molybdenum disulfide is combined with a thermoplastic elastomeric copolymer in relative amounts for example, from as low as about 2 parts per hundred rubber (pphr) to as high as about 12 pphr fibrillated polytetrafluoroethylene and molybdenum disulfide, with the balance thermoplastic elastomeric copolymer and filler. The composition can further include an unpolymerized polytetrafluoroethylene binder residue of the fibrillated polytetrafluoroethylene.

The composition of the present invention can be used in a wide variety of applications and can provide a wide variety of products. Such applications and products include, but are not limited to, hot melt, pressure sensitive, and water based emulsion adhesives, plastic modifiers, footwear, flooring material, electrical insulation and carpet underlay. The compositions can also be used in and form technical goods, such as o-rings, stoppers, flexible junctions, swim fins and underwater masks. Other applications include blown films, elastic fibers and sheet molding components.

DETAILED DESCRIPTION OF A PREFERRED EMBODIMENT

The present invention provides improved thermoplastic elastomers for use in diverse applications and products, such as, for example, sealants, caulking, seals, wiper blades, hoses, fuel lines and bearings. In the invention, a thermoplastic elastomer is combined with fibrillatable polytetrafluoroethylene to form a composite structure that greatly enhances the mechanical properties of the thermoplastic elastomer.

The thermoplastic elastomeric copolymers can comprise thermoplastic elastomers, most preferably, thermoplastic elastomeric block polymer elastomers. The elastomeric copolymers generally comprise at least two incompatible polymers that react to form a two-phase copolymer including thermoplastic polymer end blocks and an elastomeric polymer mid block. In use, the thermoplastic polymer end blocks form, as one phase, discrete thermoplastic "domains" that are separate from interconnecting elastomeric "chains", as the second phase, formed by the elastomeric mid block polymers.

Thermoplastic elastomeric copolymers that may be used in the invention include the thermoplastic elastomers sold by the Shell Chemical Company of Houston, Tex., as their KRATON D-grades and KRATON G-grades, and the thermoplastic elastomers sold by Eni-Chem Elastomeri Srl of Milano, Italy, and EniChem Elastomers Ltd. of South Hampton, Great Britain as their EUROPRENE products. These thermoplastic non-vulcanite elastomers include linear styrene-butadiene-styrene copolymers, branch styrene-butadiene copolymers, linear styrene-isoprene-styrene copolymers, branch styrene isoprene copolymers, linear styrene-ethylene/butylene-styrene copolymers, and di-block styrene ethylene-propylene copolymers. The invention is also useful with polyester, polyurethane and polyamide block copolymers as well as polypropylene/ethylene-propylene copolymers. Moreover, the invention is not limited to use with copolymers, but can be used with polymers and terpolymers, i.e. olefinics and vulcanites. The present invention is believed to improve properties of all thermoplastic elastomeric materials.

In the invention, such thermoplastic elastomeric copolymers are combined with fibrillatable polytetrafluoroethylene (PTFE) particles and molybdenum disulfide particles, which are preferably preassociated. The fibrillatable PTFE preferred for use in the invention is a coagulated dispersion polymer such as FLUON CD1 made by ICI Americas, DF11X made by Ausimont, or TEFLON K-10 made by E. I. dupont de Nemours. FLUON CD1 is a preferred fibrillatable PTFE in the invention because it can be dispersed more readily in the elastomer and fibrillates with a greater length-to-diameter ratio than other fibrillatable polytetrafluoroethylenes.

In the past, such coagulated dispersions have been exposed at high temperatures in drying the particulate resin material. The fibrillatable PTFE preferably used in my invention should be exposed to lower temperatures in drying the particulate resin material to obtain fibrillatable PTFE particles capable of fibrillation to achieve very high length-to-diameter ratios. In addition, such fibrillatable PTFE is accompanied by polytetrafluoroethylene binder residue. In determining preferred coagulated dispersions, preferred coagulated dispersions can be extruded through a small orifice (e.g., orifice with a cross section of about ¼ inch or less) by a hydraulic ram with pressures of only about 12,000 psi, while non-preferred resins require markedly higher ram pressures of, for example, 15,000 psi.

As indicated above, it is believed that the manner in which the coagulated dispersion polymers that comprise fibrillatable PTFE are processed during their manufacture affects the structure of the fibrillatable PTFE particles and the ease with which they may be fibrillated into fibers having a high ratio of fiber length to fiber diameter. Although it is not clearly understood, it is further believed that altering manufacturing processes to reduce dense or hard layers on the outside of the PTFE polymer particles permits the particles to be drawn into longer and thinner fibers. Among the factors used in manufacturing coagulated dispersions that may increase the surface hardness of the coagulated dispersion PTFE particles are the processing steps used to avoid further agglomeration of the coagulated dispersion PTFE particles and to remove anti-agglomeration agents and water from, and dry, the coagulated dispersion particles. Use of high temperatures, for example, to remove lubricants and water and dry the coagulated dispersion particles may tend to make the surface of coagulated dispersion particles harder or more dense and render them more difficult to fibrillate.

The preferred molybdenum disulfide is technical grade powder such as that sold by Amax, Inc. as its technical grade. Such powdered $MoS_2$ generally has, in technical grade, about 85 percent of its particles smaller than 44 microns and may be provided with small average particle sizes (e.g., less than ten microns), and is characterized by substantial purity with over 98 percent comprising $MoS_2$ and less than 2 percent comprising such materials as insoluble acids, minerals, carbon, water and oil. Molybdenum disulfide withstands pressures exceeding 500,000 psi and is serviceable through temperatures of $-375°$ F. to $750°$ F.

The $MoS_2$ particles are an important part of this invention. Fibrillatable PTFE alone tends to sheet rather than fibrillate when an attempt is made to mix it with thermoplastic copolymer elastomers. It is believed that the $MoS_2$ permits more intimate engagement of the fibrillated PTFE and thermoplastic elastomeric copolymer structure through its reaction with the surfaces of the PTFE and thermoplastic elastomeric copolymer.

In manufacturing the modified thermoplastic elastomeric compositions of this invention, the particles of fibrillatable PTFE and $MoS_2$ are preferably preassociated. In preparing the preassociated combination of PTFE and $MoS_2$, particulate fibrillatable PTFE and particulate $MoS_2$ are preferably placed together in a mixing apparatus, such as a rotating mixing barrel, and intermixed together. Preferably, the particle size of the $MoS_2$ particles is generally many times smaller than the particle size of the fibrillatable PTFE. Fibrillatable PTFE can have median particle sizes as large as 450 to 600 microns, although average particle sizes substantially smaller than 450 to 600 can be used. The $MoS_2$ used in the invention is preferably technical grade and has a substantial majority of particles with sizes less than about 45 microns, with average particle sizes as small as about four microns and less. The average particle size of the $MoS_2$ can be one-twentieth that of the fibrillatable PTFE and smaller. The particulate matter is mixed together for a sufficient time that the $MoS_2$ particles are generally adherent to the fibrillated PTFE particles, and the mixture particles become uniformly grey-black in appearance. As an example, 150 pounds of additive material was obtained with 15 minutes of agitation and mixing. The adherence of the $MoS_2$ particles to the particulate PTFE is believed to be enhanced by an electrostatic charge differential that may be developed between the PTFE particles and the $MoS_2$ particles while they are being mixed together.

The prior association of molybdenum disulfide particles with fibrillatable polytetrafluoroethylene particles greatly assists the fibrillation and uniform combination of the fibrillated PTFE with the thermoplastic elastomer copolymer in this invention. The $MoS_2$ particles associated with the surface of the fibrillatable PTFE particles, it is believed, enhance the combination of the fibrillated PTFE particles with the elastomeric polymer phase of the thermoplastic copolymer and deter an adherent association of the PTFE particles with themselves. Furthermore, it is believed that the coating of $MoS_2$ articles on the fibrillatable PTFE particles interacts with the surrounding thermoplastic elastomeric copolymer upon mixing and assists in the fibrillation of the PTFE.

One additive comprises fibrillatable PTFE, preferably FLUON CD1 OF ICI Americas, Inc., which is soft as a result of lower temperature drying of the PTFE particles during manufacture and capable of extrusion through a small orifice by a hydraulic ram at pressures of 12,000 psi or less, and a technical grade $MoS_2$ powder, such as that sold by Amax, Inc., and Cyprus Industrial Minerals Company, generally adherent to the fibrillatable PTFE particles. The ratio of fibrillatable PTFE to $MoS_2$ in the additive is preferably from about 3 to 1 to about 6 to 1 by weight. The preassociated PTFE and $MoS_2$ combine more easily with some thermoplastic elastomeric copolymers than with others, and it may be possible and advisable to produce the preassociated PTFE and $MoS_2$ additives with ratios other than as set forth above.

In the manufacture of the modified thermoplastic elastomeric composition of the invention, the thermoplastic elastomeric copolymer, preferably in crumb-like or powder-like form and, preferably, the preassociated fibrillatable PTFE and the $MoS_2$ particles are combined in a high shear mixer such as, preferably, a twin screw extruder or any other mixing and/or extruding apparatus which may provide sufficient shear to fibrillate the fibrillatable PTFE particles, for example, a Banbury mixer. In manufacture of the present invention, the copolymer and PTFE-$MoS_2$ additive are mixed under high shear until the mixture becomes uniform in appearance.

In addition, while it is preferred to combine a preassociation of fibrillatable PTFE and $MoS_2$ particles with pellet-like thermoplastic elastomeric copolymer, the copolymer can be combined with the fibrillatable PTFE and $MoS_2$ particles separately. In such a situation, after placing the thermoplastic elastomeric copolymer in the shear-producing mixing and/or extruding apparatus, fibrillatable PTFE particles and $MoS_2$ particles are then added to the apparatus as mixing is effected. The amount of $MoS_2$ used in the invention to effect a more uniform and effective combination of the fibrillated PTFE and the thermoplastic elastomeric copolymer may be easily determined by adding the $MoS_2$ to the fibrillatable PTFE copolymer mixture until the fibrillatable PTFE becomes uniformly fibrillated and mixed with the copolymer.

In preferred methods of manufacturing the modified thermoplastic elastomeric composition of the present invention, about 93 percent of the fibrillatable PTFE particles are converted to fibrils, that is, elongated, solid PTFE fiber-like elements, with shear. As noted above, fibrillatable PTFE is a coagulated dispersion, and may include as much as 10 percent (by weight) of non-solid, binder which is not converted into fibrils. This binder is unpolymerized PTFE. It is theorized that the unpolymerized PTFE acts like a chemically inert coating for the thermoplastic copolymer structure and the fibrillated PTFE mechanically combines with the elastomeric mid block polymers, that is, the elastomeric polymer portion of the molecular structure formed by the lattice of thermoplastic elastomeric copolymer.

One example of a modified thermoplastic elastomer composition of the invention that is useful as an asphalt modifier comprises 100 parts rubber of EniChem linear SBS copolymer SOL T6302 combined with two parts (per hundred rubber) of preassociated fibrillatable PTFE and molybdenum disulfide particles sold by Alphaflex Industries, Inc. under their tradename Alphaflex 101. Alphaflex 101 includes a preassociation of FLUON CD1 fibrillatable PTFE particles having diameters in the range of about 100 to about 600 microns, and molybdenum disulfide particles having an average particle size in the range of about one to about ten microns being largely adherent to the fibrillatable PTFE particles. The asphalt modifier results from mixing the linear SBS T6302 copolymer and Alphaflex 101 additive together in a twin screw extruder until substantially all of the fibrillatable PTFE is fibrillated and uniformly mixed with the linear SBS T6302 copolymer and extruded as an asphalt modifier for use in the invention.

The asphalt modifier is then combined with AC-20 asphalt to provide an asphalt composition using standard asphalt preparation techniques well known to those skilled in the art. Approximately 3.75 percent by weight of the asphalt modifier is mixed with the liquified AC-20 asphalt at temperatures above the glass transition temperature, but below the degradation temperature, of the linear SBS T6302 copolymer. Samples of the resulting AC-20 asphalt composition, without aggregate, are prepared for various tests.

The AC-20 asphalt composition samples incorporating the invention demonstrate surprising enhanced physical properties. In the force ductility test, the AC-20 asphalt composition has six times the tensile properties of the unmodified AC-20 asphalt at 1,000 percent elongation, and the maximum tensile strength of the AC-20 asphalt composition incorporating the invention is almost ten times better than the tensile strength of the unmodified AC-20 asphalt. A table of the comparative physical properties follows:

| COMPARISON OF PHYSICAL PROPERTIES | | |
| --- | --- | --- |
| | AC-20 | AC-20+ 3.75% T6302 with 2 phr Alphaflex 101 |
| Absolute Viscosity, poises @ 140° F. | 2,050 | 8,400 |
| Kinematic Viscosity, cst @ 275° F. | 351 | 1,351 |
| Penetration, dmm @ 77° F. | 66 | 46 |
| Ring & Ball Softening Point, Degrees F. | 120 | 167 |
| Elastic Recovery, Percent | 7.5 | 95 |
| Force Ductility, Pounds @ 1,000% Elongation Maximum Force | 0.0 | 0.55 |
| After Initial Yield | 0.04 | 0.97 |

The physical properties of AC-20 asphalt composition of this invention are surprisingly better than not only the unmodified AC-20 asphalt, but also the AC-20 asphalt when modified with 3.75 percent of the linear SBS T6302 copolymer alone. For example, the elongation maximum force after initial yield of the AC-20 asphalt composition modified by the invention is four times that of AC-20 asphalt when modified with the linear SBS T6302 alone.

Thus, surprisingly improved asphalts for road construction can be provided with the invention. In an asphalt composition, an asphalt is mixed in the ratio of from about 92 to about 97 percent by weight of asphalt with about 3 to about 8 percent by weight of an asphalt modifier which itself includes about 88 to about 98 percent by weight thermoplastic non-vulcanite elastomeric copolymer combined with about 2 to about 12 pphr of fibrillated PTFE particles and molybdenum disulfide particles, preferably in a ratio of three parts by weight of fibrillated PTFE to one part by weight of molybdenum disulfide.

In laying pavement with an asphalt composition modified by the invention, the aggregate content of the road typically can comprise about 92 to about 96 percent by weight of the pavement and the asphalt content can comprise approximately 4 to about 8 percent by weight. With asphalt compositions of the invention, as little as 0.000024 percent of fibrillated polytetrafluoroethylene and molybdenum disulfide incorporated into the asphalt composition of the pavement can surprisingly improve the rheological and temperature susceptibility properties of the asphalt road, even if reground rubber is used to replace a portion of the mineral aggregate normally used.

Compared with asphalts equally modified with only thermoplastic elastomeric copolymers, asphalt compositions modified by this invention demonstrate surprisingly and unexpectedly improved penetration resistance and resistance to the penetration of water, substantially greater tensile strengths, substantially reduced polymer degradation with temperature and aging, substantially improved chemical inertness and resistance to chemical breakdown from hydrocarbons such as oil and gasoline to which a road surface is typically exposed, substantially reduced flow in response to stress at elevated temperatures, substantially improved elastic recovery, reduced compression setability, and improved recyclability and melt process ability.

One of the major advantages obtained by use of the invention with thermoplastic elastomeric materials is the dramatic improvement of the chemical inertness of the thermoplastic elastomer. For example, a thermoplastic elastomer exposed to pure chlorohexane and/or toluene completely dissolves in a matter of minutes. However, a thermoplastic elastomer of the invention, including as little as 2 pphr of fibrillatable PTFE and MoS$_2$, as described above, comprises a thermoplastic elastomer nearly impervious to the chlorohexane and/or toluene.

The chemical resistance imparted by the invention also extends to gaseous agents. For example, rubber seals and gaskets used in downhole drilling for petroleum products are susceptible to degradation and destruction by chlorine and sour gases coming from the wells. However, seals and gaskets made using the invention have become totally inert and impervious to the chlorine and sour gases.

While a preferred embodiment and best made of the invention have been described above, changes may be made in the described embodiments without departing from the scope of this invention as established in the following claims.

I claim:

1. A composition comprising:
   (a) about 2 percent to about 12 percent of a combination of fibrillatable polytetrafluoroethylene and molybdenum sulfide; and
   (b) the balance of a thermoplastic elastomeric block copolymer.

2. The composition of claim 1 wherein the thermoplastic elastomeric block compolymer comprises a two phase copolymer of two incompatible polymers comprising a thermoplastic end block polymer and an elastomeric mid block polymer.

3. The composition of claim 2 wherein the thermoplastic end block polymer is a styrene polymer.

4. The composition of claim 2 wherein the elastomeric mid block polymer is a polymer selected from a group consisting of polybutadiene, polyisoprene and poly (ethylene-butylene).

5. The composition of claim 2 wherein the elastomeric mid block polymer comprises an unsaturated polymer.

6. The composition of claim 2 wherein the elastomeric mid block polymer is a saturated polymer.

7. The composition of claim 1 wherein the ratio of fibrillated polytetrafluoroethylene to molybdenum disulfide is in a range of about 3 to 1 to about 6 to 1 by weight.

8. The composition of claim 7 further comprising an unpolymerized polytetrafluoroethylene binder residue of the fibrillated polytetrafluoroethylene.

9. The composition of claim 7 wherein said thermoplastic elastomeric block copolymer is a styrene-butadiene copolymer, and said effective amount of fibrillated polytetrafluoroethylene and molybdenum disulfide comprises from about 2 to about 12 parts per 100 parts by weight of copolymer.

10. The composition of claim 7 wherein said thermoplastic elastomeric block copolymer is a styrene-isoprene copolymer, and said effective amount of fibrillated polytetrafluoroethylene and molybdenum disulfide comprises from about 2 to about 12 parts per 100 parts by weight of copolymer.

11. The composition of claim 7 wherein said thermoplastic elastomeric block copolymer is a styrene-ethylene-butadiene copolymer, and said effective amount of fibrillated polytetrafluoroethylene and molybdenum disulfide comprises from about 2 to about 12 parts per 100 parts by weight of copolymer.

12. The composition of claim 1 wherein the thermoplastic elastomeric block copolymer includes a styrene-isoprene block copolymer.

13. A composition resulting from a method, comprising:
mixing together a thermoplastic elastomeric block copolymer, fibrillatable polytetrafluoroethylene in an amount in a range from about 2 parts per hundred rubber to about 12 parts per hundred rubber and an amount of molybdenum disulfide that is effective to uniformly incorporate the particulate polytetrafluoroethylene in the thermoplastic elastomeric block copolymer.

14. The composition resulting from the further steps of molding and curing the composition of claim 13.

15. The composition of claim 13 wherein the fibrillatable polytetrafluoroethylene lies in the range of 2 percent by weight to 12 percent by weight and the amount of molybdenum disulfide lies in a range of from about 0.17 parts per part to about 0.3 parts per part of fibrillatable polytetrafluoroethylene.

16. The composition of claim 13 further comprising non-fibrillated particulate material.

17. A composition resulting from the steps of:
mixing together a thermoplastic elastomeric block copolymer and a fibrillatable polytetrafluoroethylene with an amount of molybdenum disulfide to effect uniform mixing of the polytetrafluoroethylene in the elastomer; and
curing the mixture to obtain a recoverable elastic solid.

18. The composition of claim 17 wherein the fibrillatable polytetrafluoroethylene includes from about 2 parts per hundred rubber to about 12 parts per hundred rubber of fibrillated polytetrafluoroethylene and up to about an equal amount of molybdenum disulfide.

19. A method of incorporating polytetrafluoroethylene material into a thermoplastic elastomer, comprising:
placing together a quantity of thermoplastic elastomeric block copolymer and a quantity of particulate polytetrafluoroethylene material,
adding an effective amount of molybdenum disulfide, and
mechanically mixing together the thermoplastic elastomeric block copolymer, particulate polytetrafluoroethylene material, and the molybdenum disulfide to obtain a uniform dispersion of the particulate polytetrafluoroethylene material in the thermoplastic elastomeric block copolymer.

20. The method of claim 19 wherein the particulate polytetrafluoroethylene is capable of fibrillation and is fibrillated as it is mixed in the elastomer.

21. A composition, comprising:
a solid matrix of cured thermoplastic elastomeric block copolymer, polytetrafluoroethylene and molybdenum disulfide in which at least a portion of said polytetrafluoroethylene is fibrillated and is uniformly dispersed in the thermoplastic elastomer matrix with particulate molybdenum disulfide.

22. The composition of claim 21 wherein the polytetrafluoroethylene particles comprise at least 25 percent by weight of the total composition.

23. The composition of claim 21 wherein the fibrillatable polytetrafluoroethylene is present in an amount of at least about 2 parts per hundred rubber and the total amount of polytetrafluoroethylene is less than about 12 parts per hundred rubber.

24. The composition of claim 23 wherein the polytetrafluoroethylene particles comprise about 25 percent by weight to about 50 percent by weight of the total composition.

25. The composition of claim 1 wherein the thermoplastic elastomeric block copolymer includes a styrene-butadiene block copolymer.

26. The composition of claim 1 wherein the thermoplastic elastomeric block copolymer comprises a terpolymer.

* * * * *

UNITED STATES PATENT AND TRADEMARK OFFICE
CERTIFICATE OF CORRECTION

PATENT NO. : 5,418,270

DATED : May 23, 1995

INVENTOR(S) : William E. Peters

It is certified that error appears in the above-indentified patent and that said Letters Patent is hereby corrected as shown below:

In Col. 2, line 59, after "polymers" delete "," (comma) and insert --.-- (period).

In Col. 3, line 55 before "polymers", insert --monomers,--.

In Col. 3, line 65, change "dupont" to --duPont--.

In Col. 6, line 20, after "non-solid", delete "," (comma).

In Col. 8, line 20, change "made" to --mode--.

Signed and Sealed this

Twentieth Day of August, 1996

*Attest:*

BRUCE LEHMAN

*Attesting Officer*     *Commissioner of Patents and Trademarks*